2,960,493

FIBER AND FILM-FORMING POLYCONDENSATES

Andre Jan Conix, Hove-Antwerp, Belgium, assignor to Gevaert Photo-Producten N.V., Martsel, Belgium, a Belgian company No Drawing. Filed Mar. 7, 1957, Ser. No. 644,469

Claims priority, application Great Britain Apr. 25, 1956

7 Claims. (Cl. 260—47)

This invention relates to new high-polymeric aromatic anhydrides and to a process for the preparation thereof. Said polymers have valuable properties as fiber and film-forming materials.

Synthetic polyanhydrides derived from aliphatic acids and capable of being formed into fibers have been described in the scientific and patent literature (J. W. Hill and W. H. Carothers, J. Am. Chem. Soc. 54 (1932) 1569; Patent Nos. 2,071,250 and 2,071,251). However, the polyanhydrides hitherto described suffer from the defect of having low melting points and, particularly, an appreciable sensitivity to hydrolytic degradation. Fibers drawn from known aliphatic polyanhydrides lose their strength and flexibility on standing at room temperature for a few hours.

Synthetic aromatic polyanhydrides have been synthesized from isophthalic and terephthalic acid (J. Am. Chem. Soc. 31 (1909) 1319). These products, however, have a very low molecular weight and decompose below their melting points and consequently are incapable of yielding shaped articles such as fibers or films.

It is an object of my invention to provide linear high-polymeric aromatic anhydrides which will have valuable properties, such as high melting points, a low degree of solubility in organic solvents, and great stability toward hydrolytic degradation.

Another object of the invention is the provision of mixed aromatic anhydrides from which the high-polymeric anhydrides can be made.

Further objects are directed toward new and useful filaments, fibers, films, and other shaped articles, made from my polyanhydrides.

Still further objects will appear from the following description.

In accordance with this invention, the foregoing and other objects which will appear hereinafter are accomplished by providing new and useful linear high-polymeric aromatic anhydrides having recurring structural units of the general formula:

$$-OC-OAr-R-Ar'-C-$$
$$\phantom{-OC-OA}\|\phantom{r-R-Ar'-}\|$$
$$\phantom{-OC-OAr-R-Ar'-C}O\phantom{xxxxxx}O$$

wherein Ar and Ar' represent the same or different aromatic nuclei, the carbonyl groups are in the para or meta-position, and R represents $-O-$   $-CH_2-$   $-OCH_2-\langle\ \rangle-CH_2O-$ $-CH_2O-\langle\ \rangle-OCH_2-$   $-O-CH\begin{smallmatrix}CH_2-CH_2\\ \\CH_2-CH_2\end{smallmatrix}CH-O-$ or $-O-CH\begin{smallmatrix}CH_2-O\\ \\O-CH_2\end{smallmatrix}CH-O-$ Said anhydrides have valuable properties. Particularly, they are capable of being formed into filaments, fibers, films, and other shaped articles, and have high melting points, a low degree of solubility in organic solvents, and great stability toward hydrolytic degradation.

The fibers and films according to my invention are formed by extruding the molten polymer and show molecular orientation by characteristic X-ray patterns.

The polyanhydrides of my invention are derived from dicarboxylic acids of the following general formula:

$$HOOC-Ar-R-Ar'-COOH$$

wherein R represents a radical as defined above, and the carboxyl groups are in the para or meta-position in the aromatic nuclei.

As specific aromatic dicarboxylic acids, the following examples are mentioned:

Phenoxybenzene-3:3'-dicarboxylic acid
Phenoxybenzene-4:4'-dicarboxylic acid
Diphenylmethane-3:3'-dicarboxylic acid
Diphenylmethane-4:4'-dicarboxylic acid
1:4-di(benzyloxy)benzene-3':3''-dicarboxylic acid
1:4-di(benzyloxy)benzene-4':4''-dicarboxylic acid
1:4-di(benzyloxy)benzene-3':4''-dicarboxylic acid
1:4-di(phenoxy-methyl)benzene-4':4''-dicarboxylic acid
1:4-di(phenoxy-methyl)benzene-3':3''-dicarboxylic acid.

It is to be understood that the present invention is not restricted to the production of polyanhydrides derived exclusively from only one kind of the above mentioned acids. Copolyanhydrides containing units from two or more of these or other dibasic acids fall also within the scope of my invention.

My polyanhydrides may be prepared by heating a mixed anhydride of one of the above listed dicarboxylic acids and of acetic acid, the mixed anhydride having the following general formula:

$$R'-O-OC-\langle\ \rangle-R-\langle\ \rangle-CO-O-R'$$

wherein one R' radical is acetyl, the other R' radical is acetyl or hydrogen, and R has the same meaning as above indicated.

The next preceding formula represents the monomers of what is referred to in the present specification and claims as "mixed anhydrides."

They can conveniently be prepared by heating a dicarboxylic acid in the presence of an excess of acetic anhydride. Heating should be effected at a temperature sufficiently high to cause distillation of acetic acid and acetic anhydride. Particularly good results are obtained if the distillation of the acetic acid occurs through a sufficiently effective fractionation column capable of separating acetic acid from acetic anhydride. The reaction can be considered terminated when the temperature of the distilling liquid approaches the theoretical boiling point of pure acetic anhydride. Upon cooling the residue, the mixed anhydrides of the dicarboxylic acid and acetic separate out as a crystalline white powder which can be isolated or, if necessary, recrystallized from a suitable solvent, such as benzene or fresh acetic anhydride.

Alternatively, the mixed anhydrides may be kept in acetic anhydride solution and the solution may be used as such for the subsequent polycondensation reaction.

It is also to be noted that my invention is not restricted to the use of mixed anhydrides of an aromatic dicarboxylic acid and acetic acid. Instead of acetic acid, any aliphatic monocarboxylic acid may be used as a component of the mixed anhydrides, provided its boiling point is sufficiently low so as to allow distillation at a convenient temperature (140 to 250° C.). Out of such monocarboxylic acids, acetic acid is preferred because of its low boiling point, low cost, and easy availability.

The polycondensation reaction to my invention is carried out by heating one or more of the above indicated mixed anhydrides. During the heating, the temperature is advantageously kept near or above the melting point of the resulting polymer, and in any case sufficiently high so as to cause liberation and distillation of the aliphatic acid anhydride. During this process, the melting point and the viscosity of the reaction mixture gradually increase. Heating is carried on until a product of fiber-forming properties is obtained. The heating may be done at atmospheric or subatmospheric pressures.

In a preferred method of preparation, the heating is effected at first at atmospheric pressure. Once the greater part of acetic anhydride has distilled, heating is continued under reduced pressure until filaments formed from the melt possess the property of cold-drawing.

In order to obtain polyanhydrides of outstanding fiber-forming and cold-drawing properties, it is important to provide for an effective stirring of the reaction mass. This can advantageously be done by bubbling a stream of an inert gas, such as nitrogen, through the molten mass or by agitating the viscous mass by means of a powerful agitator.

Although the polycondensation is advantageously carried out while the reaction mass is maintained in the molten state, this is by no means necessary.

The polycondensation can also be carried out by heating the mixed anhydride of a dibasic acid just below its melting point and gradually raising the temperature as the melting point of the reaction mass increases due to the production of a higher polyanhydride, but keeping the temperature always below the melting point.

The polycondensation in powder form is best carried out under sub-atmospheric pressure, preferably under a high vacuum. Heating is continued until a stage is reached where by melting the reaction product satisfactory fiber-forming and cold-drawing properties are observed.

In another way of practicing my invention, the polycondensation can be carried out in solution.

In some cases, it is desired to obtain the final polyanhydride in solution, and if desired it may be obtained in powder form. This can be achieved in either case by carrying out the preparation of the polyanhydride in a medium consisting of an inert high boiling solvent for the polyanhydride, such as α-methylnaphthaline, diphenyl, diphenyloxide, or the like. Advantageously, a solvent is chosen that has a boiling point well above the boiling point of the aliphatic acid anhydride, thus facilitating the distillation of the latter. An advantage of this procedure is that the polycondensation can be carried out in a reasonably short time without the use of sub-atmospheric pressures.

According to this particular procedure, the polyanhydride is obtained in powder form upon cooling the polymerized polymer solution if use has been made of a solvent which is only effective at high temperature and is a non-solvent at ordinary temperatures.

If a solvent has been used which is a solvent for the polymer within the whole temperature range from room temperature to the boiling point of the solvent, the polymer is obtained as a viscous solution from which the polymer can be precipitated by adding a sufficient amount of non-solvent.

The products of my invention are linear high-polymeric anhydrides having recurring structural units of the following formula:

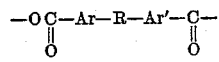

wherein the symbols have the above defined meaning.

My polyanhydrides, when freshly formed and in the undrawn state, are sometimes amorphous in character. If the melts are allowed to cool slowly, crystallization occurs and the glassy transparent solids become opaque.

The polyanhydrides of the invention have melting points up to about 300° C. The exact melting point depends on the particular chemical structure of the repeating unit. Especially high melting points are obtained when the recurring units possess a symmetrical structure. The polyanhydrides in which the radicals R are symmetrical and directly united with the aromatic nuclei by means of oxygen atoms are particularly valuable polymeric materials. The polyanhydrides are soluble in nitrobenzene, hot α-methylnaphthaline, hot diphenyl, hot diphenyloxide, isophoron, m-cresol, phenol, tetrachlorethane and the like, or in mixtures of same.

It is an entirely unexpected and a most useful aspect of my invention that the aromatic polyanhydrides show a remarkable resistance to cold and hot acids and alkalis. Even when exposed for longer periods of time to the action of concentrated alkali, the polyanhydrides show only little degradation in molecular weight, nor do they lose their ability to be drawn to strong and flexible fibers and films.

When extruded or drawn in the molten state, the polyanhydrides yield filaments or films which can subsequently be cold drawn whereby molecularly oriented structures, i.e. fibers or films of great strength and flexibility are obtained.

Owing to the possibility of carrying out the polycondensation at a very rapid rate without the use of a catalyst, which in other polycondensation reactions such as polyesterifications results in slightly opaque films or filaments, the products and especially the films made according to my invention are very useful when highly transparent articles are desired such as photographic film base.

The following examples illustrate my invention without limiting, however, the scope thereof.

EXAMPLE 1

Preparation of a mixed anhydride of 1:4-di(phenoxymethyl)benzene-4':4''-dicarboxylic acid 16 g. of a dicarboxylic acid of the formula:

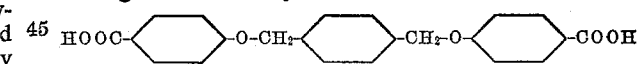

and 320 cc. acetic anhydride are refluxed together in a reaction flask fitted with an efficient fractionating column. A mixture of acetic acid and acetic anhydride is slowly distilled. After about 30 minutes reaction time, a homogeneous fluid reaction mass is obtained. Distillation of acetic acid and acetic anhydride is continued under reduced pressure. The temperature of the distilling liquid is held between 60 and 80° C. When the total amount of the distilled liquid is about 150 cc., the distillation is discontinued and the reaction flask cooled in an ice bath. Upon cooling, a white crystalline precipitate is obtained which can be separated by filtration. Yield: 18 g. Melting point: 130–140° C.

EXAMPLE 2

Preparation of poly-1:4-di(phenoxy-methyl)benzene-4':4''-dicarboxylic acid anhydride 18 g. of a mixed anhydride of 1:4-di(phenoxy-methyl)benzene-4':4''-dicarboxylic acid and acetic acid, as obtained according to example 1, are heated to a temperature of 305° C. Upon heating, the solid gradually melts and a slow current of nitrogen gas is bubbled through the reaction mass. A very rapid evolution of acetic anhydride takes place which is removed from the reaction zone by distillation. After about 5 minutes, the rate of distillation slows down. Subsequently, the reaction vessel is evacuated to a vacuum of about 1 mm. Hg and heating is continued at 305° C. The viscosity of the molten reaction mass gradually increases until, after about 30 minutes reaction time, no apparent further change in melt viscosity can be observed. Upon melting the product, very strong flexible fibers can be drawn continuously from the melt. The fibers possess the characteristic property of cold-drawing.

The material has a crystalline melting point of 280–296° C.

EXAMPLE 3

*Preparation of a mixed anhydride of 1:4-di(benzyloxy)-benzene-4':4"-dicarboxylic acid*

4 g. of a dicarboxylic acid of the formula:

and 150 cc. acetic anhydride are refluxed and further treated as indicated in Example 1 except that when the total amount of the distilled liquid is about 50 cc., distillation is discontinued. Yield: 4.5 g. Melting point: 160° C.

EXAMPLE 4

*Preparation of poly-1:4-di(benzyloxy)benzene-4':4"-dicarboxylic acid anhydride*

4 g. of a mixed anhydride of 1:4-di(benzyloxy) benzene-4':4"-dicarboxylic acid and acetic anhydride, as obtained according to example 3, are heated and further treated as indicated in Example 2. The material has a crystalline melting point of 280–296° C.

EXAMPLE 5

*Preparation of poly-phenoxybenzene-4:4'-dicarboxylic acid anhydride*

10 g. diphenylether-4:4'-dicarboxylic acid and 50 cc. acetic anhydride are refluxed in a reaction flask fitted with an efficient fractionating column. After 10 minutes heating, all of the dicarboxylic acid is dissolved. Heating and distillation of the mixture of acetic acid and acetic anhydride is continued under reduced pressure so as to keep the temperature of the distilling liquid below 100° C. After about two hours distillation time, no further liquid can be distilled and the residue sets to a hard crystalline solid. The residue is further heated under a vacuum of about 1 mm. Hg at a temperature of 330–340° C. The viscosity of the molten mass gradually increases until after about 4 hours no apparent further change in melt viscosity can be observed. From the melt, strong and flexible fibers can be drawn. Upon cooling the melt, a hard, crystalline solid is obtained, showing a melting range of 295–301° C.

EXAMPLE 6

*Preparation of poly-diphenylmethane-4:4'-dicarboxylic acid anhydride*

4 g. diphenyl-methane-4:4'-dicarboxylic acid and 20 cc. acetic anhydride are refluxed together. After about 10 minutes reaction time, all of the dicarboxylic acid is dissolved. The solution is rapidly concentrated under reduced pressure, while acetic acid and acetic anhydride are distilled off. When no more liquid can be distilled, the temperature is raised to 282° C. and heating of the reaction mass is continued under a pressure of about 1 mm. Hg. The viscosity of the molten mass gradually increases until after about 30 minutes no apparent further change in melt viscosity can be observed. Upon cooling the melt, a hard opaque solid is obtained, showing a melting range of 240–250° C. From the melt, strong and flexible fibers can be drawn, which show the characteristic property of cold-drawing.

EXAMPLE 7

*Preparation of the polyanhydride of 1:4-di(phenoxymethyl)benzene-3':3"-dicarboxylic acid*

8 g. of the dibasic acid of the formula:

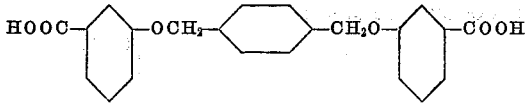

are dissolved in 170 cc. acetic anhydride at reflux temperature. The solution is concentrated under reduced pressure to a total volume of about 20 cc. Upon cooling the solution, a crystalline precipitate is obtained which can be isolated by filtration. The crystalline product essentially consists of a mixed anhydride of 1:4-di(phenoxymethyl)benzene-3':3"-dicarboxylic acid and acetic acid. It shows a melting point of 95° C. 7.5 g. of the mixed anhydride are heated at 220° C. under reduced pressure (0.1–0.5 mm. Hg). Care is taken to stir the molten viscous reaction mass continuously while distilling off acetic anhydride. After about 35 minutes reaction time, no apparent further change in melt viscosity can be observed. Upon cooling the reaction product, a horny polymer is obtained which on heating at 110° C. crystallizes into a hard opaque material with a melting point at about 225° C. Upon melting the product, strong, flexible and transparent fibers can be drawn from the melt, showing the characteristic property of cold-drawing.

I claim:

1. Linear fiber-forming polymeric aromatic anhydrides composed of recurring structural units of the formula

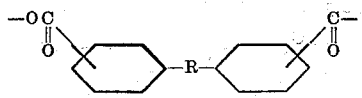

derived from an aromatic dicarboxylic acid selected from the group consisting of p,p'-dicarboxylic acids, m,m'-dicarboxylic acids, and m,p'-dicarboxylic acids, and R is a member selected from the group consisting of

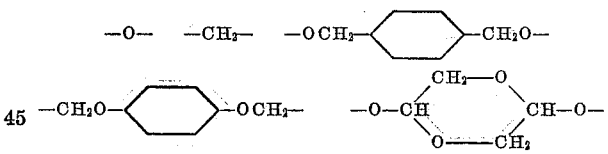

and

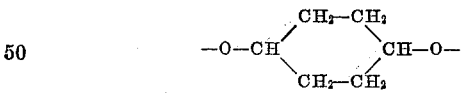

2. Process for the preparation of linear fiber-forming polymeric anhydrides, in which mixed anhydrides obtained by reacting acetic acid and aromatic dicarboxylic acids of the general formula

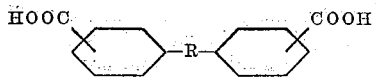

are heated, the carboxylic acids being selected from the group consisting of p,p'-dicarboxylic acids, m,m'-dicarboxylic acids, and m,p'-dicarboxylic acids, and R is a member selected from the group consisting of

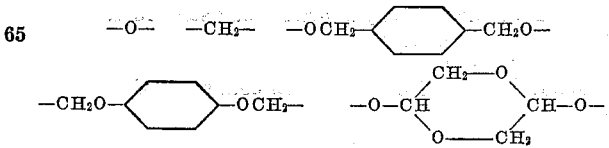

and

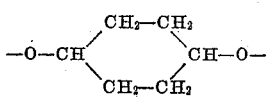

said heating being done under distillation of the fatty acid anhydride until a polymer showing fiber and film-forming properties is obtained.

3. Process for the preparation of linear fiber-forming polymeric anhydrides, in which mixed anhydrides obtained by reacting acetic acid and aromatic dicarboxylic acids of the general formula

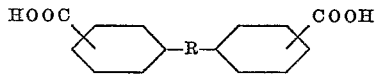

are heated, the carboxylic acids being selected from the group consisting of p,p'-dicarboxylic acids and m,m'-dicarboxylic acids, and R is a member selected from the group consisting of

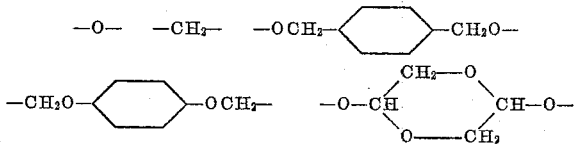

and

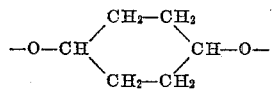

said heating being done under distillation of the fatty acid anhydride until a polymer showing fiber and film-forming properties is obtained.

4. Process for the preparation of linear fiber-forming polymeric anhydrides, in which mixed anhydrides obtained by reacting acetic acid and aromatic dicarboxylic acids of the general formula

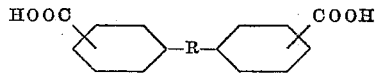

are heated, the carboxylic acids being selected from the group consisting of p,p'-dicarboxylic acids, m,m'-dicarboxylic acids, and m,p'-dicarboxylic acids, and R is a member selected from the group consisting of

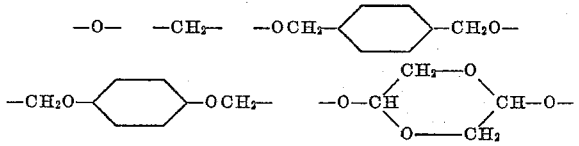

and

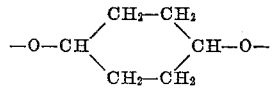

said heating being done first at atmospheric pressure and then under reduced pressure under distillation of the fatty acid anhydride until a polymer showing fiber and film-forming properties is obtained.

5. Process for the preparation of linear fiber-forming polymeric anhydrides, in which mixed anhydrides obtained by reacting acetic acid and aromatic dicarboxylic acids of the general formula

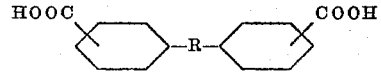

are heated, the carboxylic acids being selected from the group consisting of p,p'-dicarboxylic acids, m,m'-dicarboxylic acids, and m,p'-dicarboxylic acids, and R is a member selected from the group consisting of

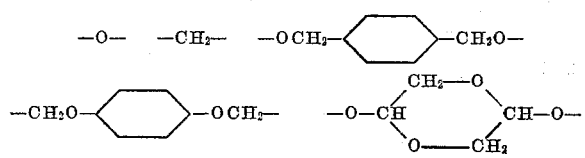

and

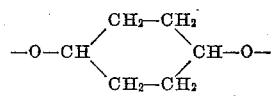

said heating being done so as to maintain the reaction mass in the molten state, and in which process said mass is mixed by bubbling a stream of nitrogen therethrough until a polymer showing fiber and film-forming properties is obtained.

6. Films made from linear high-polymeric aromatic anhydrides, composed of recurring structural units of the formula

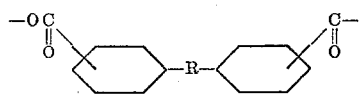

derived from an aromatic dicarboxylic acid selected from the group consisting of p,p'-dicarboxylic acids, m,m'-dicarboxylic acids, and m,p'-dicarboxylic acids, and R is a member selected from the group consisting of

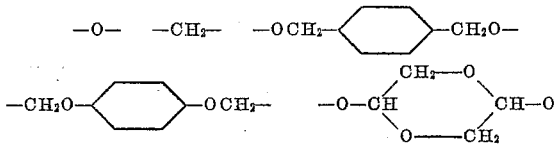

and

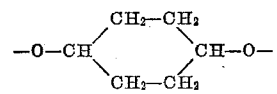

7. Fibers made from linear high-polymeric aromatic anhydrides, composed of recurring structural units of the formula

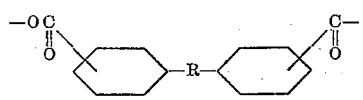

derived from an aromatic dicarboxylic acid selected from the group consisting of p,p'-dicarboxylic acids, m,m'-dicarboxylic acids, and m,p'-dicarboxylic acids, and R is a member selected from the group consisting of

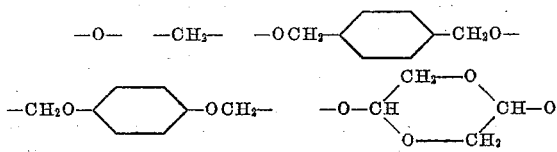

and

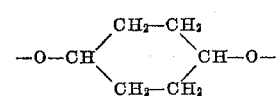

References Cited in the file of this patent

UNITED STATES PATENTS

| | | |
|---|---|---|
| 2,071,250 | Carothers | Feb. 16, 1937 |
| 2,071,251 | Carothers | Feb. 16, 1937 |
| 2,465,150 | Dickson | Mar. 22, 1949 |

FOREIGN PATENTS

| | | |
|---|---|---|
| 634,609 | Great Britain | Mar. 22, 1950 |
| 707,913 | Great Britain | Apr. 28, 1954 |

OTHER REFERENCES

Carothers: "Collected Papers," Interscience (1940), pages 96–97, 168–178, 186, 202–211, 241.